US009386436B2

(12) United States Patent
Grzywacz et al.

(10) Patent No.: US 9,386,436 B2
(45) Date of Patent: Jul. 5, 2016

(54) ALERTING MESSAGE NUMBER PER ALERTING CATEGORY ACROSS NETWORK TECHNOLOGY

(71) Applicant: Alcatel-Lucent, Paris (FR)

(72) Inventors: Zdzislaw Grzywacz, Bydgoszcz (PL); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 110 days.

(21) Appl. No.: 14/039,485

(22) Filed: Sep. 27, 2013

(65) Prior Publication Data
US 2015/0094010 A1    Apr. 2, 2015

(51) Int. Cl.
*H04M 11/04* (2006.01)
*H04W 4/22* (2009.01)
*H04W 4/06* (2009.01)
*H04W 4/20* (2009.01)
*H04W 88/06* (2009.01)
*H04W 68/12* (2009.01)
*H04W 76/00* (2009.01)

(52) U.S. Cl.
CPC *H04W 4/22* (2013.01); *H04W 4/06* (2013.01); *H04W 4/20* (2013.01); *H04W 68/12* (2013.01); *H04W 76/002* (2013.01); *H04W 76/007* (2013.01); *H04W 88/06* (2013.01)

(58) Field of Classification Search
CPC .................................. H04W 4/22; H04W 4/14
USPC ................. 455/404.1, 466, 558, 404.2, 550.1, 455/456.1; 370/235, 252, 318; 340/539.1, 340/539.13
See application file for complete search history.

(56) References Cited

U.S. PATENT DOCUMENTS

| 2009/0286502 | A1* | 11/2009 | Sennett et al. | 455/404.1 |
| 2010/0124898 | A1* | 5/2010 | Qu et al. | 455/404.1 |
| 2011/0081883 | A1* | 4/2011 | Daly | 455/404.1 |

OTHER PUBLICATIONS

FCC Commercial Mobile Service Alert Advisory Committee: "Commercial Mobile Alert Service Architecture and Requirements, Version 1.0", Federal Communications Commission (Oct. 12, 2007)—109 pages.

(Continued)

*Primary Examiner* — Kiet Doan
(74) *Attorney, Agent, or Firm* — Capitol Patent & Trademark Law Firm, PLLC (57) ABSTRACT

An example method includes receiving at a cell broadcast center information for distribution to at least one user equipment. The cell broadcast center determines an alert category and a message number for the alert category. The alert category is based on the information for distribution. The alert category is associated with one or more corresponding alert categories of a plurality of technology networks with which the cell broadcast center is configured to interact. The message number for the alert category is based on a number of alert messages previously forwarded for the alert category. An alert message is forwarded from the cell broadcast center to the at least one user equipment via one or more of the plurality of technology networks. The alert message includes the message number for the alert category and an alert category indicator indicating a respective corresponding alert category of the one or more corresponding alert categories that corresponds with the alert category.

20 Claims, 10 Drawing Sheets

(56) References Cited

OTHER PUBLICATIONS

"3GPP: 3rd Generation Partnership Project; Technical Specification Group Services and Systems Aspects; Public Warning System (PWS) Requirements (Release 12.2.0)", 3GPP TS 22.268 (Jun. 2013); 3rd Generation Partnership Project (3GPP), Cedex, France—16 pages.

3GPP: "3rd Generation Partnership Project; Technical Specification Group Radio Access Network; UTRAN Iu-B Interface: Service Area Broadcast Protocol (Release 11.1.0)", 3GPP TS 25.419 (Mar. 2013); 3rd Generation Partnership Project (3GPP), Cedex, France—78 pages.

3GPP: "3rd Generation Partnership Project; Technical Specification Group GSM/EDGE Radio Access Network; Base Station—Cell Broadcast Centre Interface Specification; Cell Broadcast Service Protocol (Release 10.0.0)", 3GPP TS 48.049 (Apr. 2011) 3rd Generation Partnership Project (3GPP), Cedex, France—55 pages.

ETSI: "Emergency Communications; European Public Warning System Using The Cell Broadcast Service (Version 1.1.1)", ETSI TS 102 900 (Jan. 2012) European Telecommunications Standard Institute (ETSI), Cedex, France—17 pages.

* cited by examiner

| CDMA CS/CATEGORY | LTE MI/CATEGORY | NOTES |
|---|---|---|
| PRESIDENTIAL (0x1000) | PRESIDENTIAL (4370) | SERIAL NUMBERS USED FOR PRESIDENTIAL (ITU 4370, IS41 0x1000) SHALL BE LINKED TOGETHER AND NOT CONSIDERED THE SAME AS OTHER BROADCASTS IN OTHER CATEGORIES |
| EXTREME (0x1001) | EXTREME/IMMEDIATE/OBSERVED (4371)<br>EXTREME/IMMEDIATE/LIKELY (4372)<br>EXTREME/EXPECTED/OBSERVED (4373)<br>EXTREME/EXPECTED/LIKELY (4374) | SERIAL NUMBERS USED FOR "EXTREME" SHALL BE LINKED TOGETHER AND NOT BE CONSIDERED THE SAME AS OTHER BROADCASTS IN OTHER CATEGORIES |
| SEVERE (0x1002) | SEVERE/IMMEDIATE/OBSERVED (4375)<br>SEVERE/IMMEDIATE/LIKELY (4376)<br>SEVERE/EXPECTED/OBSERVED (4377)<br>SEVERE/EXPECTED/LIKELY (4378) | SERIAL NUMBERS USED FOR "SEVERE" SHALL BE LINKED TOGETHER AND NOT BE CONSIDERED THE SAME AS OTHER BROADCASTS IN OTHER CATEGORIES |
| AMBER (0x1003) | CHILD ABDUCTION (4379) | SERIAL NUMBERS USED FOR CHILD ABDUCTION (ITU 4379, IS41 0x1003) SHALL BE LINKED TOGETHER AND NOT BE CONSIDERED THE SAME AS OTHER BROADCASTS IN OTHER CATEGORIES |
| TEST (0x1004) | REQUIRED MONTHLY TEST (4380)<br>EXERCISE (4381)<br>OPERATOR DEFINED (4382) | SERIAL NUMBERS USED FOR "TEST" SHALL BE LINKED TOGETHER AND NOT BE CONSIDERED THE SAME AS OTHER BROADCASTS IN OTHER CATEGORIES |

| CATEGORY/CS/MI | ALERT NUMBER |
|---|---|
| PRESIDENTIAL | A1 |
| EXTREME (IMMEDIATE/OBSERVED) | A1 |
| EXTREME (IMMEDIATE/OBSERVED) | A2 |
| EXTREME (IMMEDIATE/LIKELY) | A3 |
| TEST (RMT) | A1 |
| TEST (EXERCISE) | A2 |
| AMBER | A1 |
| AMBER | A2 |
| AMBER | A3 |
| SEVERE (IMMEDIATE/OBSERVED) | A1 |
| SEVERE (IMMEDIATE/OBSERVED) | A2 |
| SEVERE (IMMEDIATE/OBSERVED) | A3 |
| SEVERE (IMMEDIATE/LIKELY) | A4 |
| SEVERE (EXPECTED/LIKELY) | A5 |
| TEST (RMT) | A3 |
| AMBER | A4 |
| SEVERE (IMMEDIATE/OBSERVED) | A6 |

*FIG. 5*

| CDMA | LTE | MESSAGE NUMBER FOR CATEGORY |
|---|---|---|
| PRESIDENTIAL (0x1000) | - | 1 |
| AMBER (0x1003) | - | 1 |
| AMBER (0x1003) | - | 2 |
| SEVERE (0x1002) | - | 1 |
| AMBER (0x1003) | - | 3 |
| PRESIDENTIAL (0x1000) | - | 2 |
| TEST (0x1004) | - | 1 |
| TEST (0x1004) | - | 2 |
| TEST (0x1004) | - | 3 |

FIG. 6

| CDMA | LTE | MESSAGE NUMBER FOR CATEGORY |
|---|---|---|
| - | EXTREME/IMMEDIATE/OBSERVED (4371) | 1 |
| - | EXTREME/IMMEDIATE/LIKELY (4372) | 2 |
| - | EXTREME/EXPECTED/LIKELY (4374) | 3 |
| - | SEVERE/IMMEDIATE/LIKELY (4376) | 1 |
| - | SEVERE/EXPECTED/OBSERVED (4377) | 2 |
| - | SEVERE/EXPECTED/LIKELY (4378) | 3 |
| - | EXTREME/IMMEDIATE/OBSERVED (4371) | 4 |
| - | EXTREME/IMMEDIATE/LIKELY (4372) | 5 |
| - | EXTREME/IMMEDIATE/LIKELY (4372) | 6 |
| - | SEVERE/EXPECTED/OBSERVED (4377) | 4 |
| - | SEVERE/EXPECTED/OBSERVED (4377) | 5 |
| - | REQUIRED MONTHLY TEST (4380) | 1 |
| - | EXERCISE (4381) | 2 |

FIG. 7

| CDMA | LTE | MESSAGE NUMBER FOR CATEGORY |
|---|---|---|
| PRESIDENTIAL (0x1000) | | 1 |
| - | EXTREME/IMMEDIATE/OBSERVED (4371) | 2 |
| - | EXTREME/IMMEDIATE/LIKELY (4372) | 3 |
| SEVERE (0x1002) | | 1 |
| - | SEVERE/IMMEDIATE/LIKELY (4376) | 2 |
| - | SEVERE/EXPECTED/OBSERVED (4377) | 3 |
| - | SEVERE/EXPECTED/LIKELY (4378) | 4 |
| AMBER (0x1003) | | 1 |
| TEST (0x1004) | | 1 |
| - | REQUIRED MONTHLY TEST (4380) | 2 |
| - | EXERCISE (4380) | 3 |
| - | SEVERE/IMMEDIATE/LIKELY (4376) | 5 |
| - | SEVERE/EXPECTED/OBSERVED (4377) | 6 |
| - | SEVERE/EXPECTED/LIKELY (4378) | 7 |

FIG. 8

| CDMA | LTE | MESSAGE NUMBER FOR CATEGORY |
|---|---|---|
| PRESIDENTIAL (0x1000) | PRESIDENTIAL (4370) | 1 |
| EXTREME (0x1001) | EXTREME/IMMEDIATE/OBSERVED (4371) | 1 |
| EXTREME (0x1001) | EXTREME/IMMEDIATE/LIKELY (4372) | 2 |
| EXTREME (0x1001) | EXTREME/EXPECTED/OBSERVED (4373) | 3 |
| EXTREME (0x1001) | EXTREME/EXPECTED/LIKELY (4374) | 4 |
| SEVERE (0x1002) | SEVERE/IMMEDIATE/OBSERVED (4375) | 1 |
| SEVERE (0x1002) | SEVERE/IMMEDIATE/LIKELY (4376) | 2 |
| SEVERE (0x1002) | SEVERE/EXPECTED/OBSERVED (4377) | 3 |
| SEVERE (0x1002) | SEVERE/EXPECTED/LIKELY (4378) | 4 |
| EXTREME (0x1001) | EXTREME/EXPECTED/LIKELY (4374) | 5 |
| EXTREME (0x1001) | EXTREME/EXPECTED/LIKELY (4374) | 6 |
| SEVERE (0x1002) | SEVERE/IMMEDIATE/LIKELY (4376) | 5 |
| AMBER (0x1003) | CHILD ABDUCTION (4379) | 1 |
| SEVERE (0x1002) | SEVERE/IMMEDIATE/LIKELY (4376) | 6 |
| TEST (0x1004) | REQUIRED MONTHLY TEST (4380) | 1 |
| SEVERE (0x1002) | SEVERE/EXPECTED/OBSERVED (4377) | 7 |
| EXTREME (0x1001) | EXTREME/IMMEDIATE/OBSERVED (4371) | 7 |
| TEST (0x1004) | EXERCISE (4381) | 2 |
| TEST (0x1004) | OPERATOR DEFINED (4382) | 3 |

FIG. 9

| CDMA | LTE | MESSAGE NUMBER FOR CATEGORY |
|---|---|---|
| PRESIDENTIAL (0x1000) | PRESIDENTIAL (4370) | 1 |
| EXTREME (0x1001) | EXTREME/IMMEDIATE/OBSERVED (4371) | 1 |
| EXTREME (0x1001) | EXTREME/IMMEDIATE/LIKELY (4372) | 2 |
| – | EXTREME/EXPECTED/OBSERVED (4373) | 3 |
| EXTREME (0x1001) | EXTREME/EXPECTED/LIKELY (4374) | 4 |
| SEVERE (0x1002) | SEVERE/IMMEDIATE/OBSERVED (4375) | 1 |
| SEVERE (0x1002) | SEVERE/IMMEDIATE/LIKELY (4376) | 2 |
| SEVERE (0x1002) | – | 3 |
| SEVERE (0x1002) | SEVERE/EXPECTED/LIKELY (4378) | 4 |
| EXTREME (0x1001) | – | 5 |
| EXTREME (0x1001) | EXTREME/EXPECTED/LIKELY (4374) | 6 |
| SEVERE (0x1002) | SEVERE/IMMEDIATE/LIKELY (4376) | 5 |
| AMBER (0x1003) | CHILD ABDUCTION (4379) | 1 |
| – | SEVERE/IMMEDIATE/LIKELY (4376) | 6 |
| TEST (0x1004) | REQUIRED MONTHLY TEST (4380) | 1 |
| SEVERE (0x1002) | SEVERE/EXPECTED/OBSERVED (4377) | 7 |
| EXTREME (0x1001) | EXTREME/IMMEDIATE/OBSERVED (4371) | 7 |
| TEST (0x1004) | EXERCISE (4381) | 2 |
| TEST (0x1004) | OPERATOR DEFINED (4382) | 3 |

FIG. 10

ALERTING MESSAGE NUMBER PER ALERTING CATEGORY ACROSS NETWORK TECHNOLOGY

BACKGROUND

This application relates generally to communication systems, and, more particularly, to alert messages, such as emergency alert messages, broadcast and provided to user equipment such as mobile devices.

Since the enactment of the Warning, Alert, and Response Network Act (WARN Act) in 2006 by the United States government, it has become important for mobile service providers, especially mobile carriers in the United States, to support emergency message broadcast/alert to mobile users. The WARN Act sought, in part, the establishment of a voluntary National Alert System to provide a public communications system capable of alerting the public to emergency situations on a national, regional, or local basis and set forth system functions and capabilities, including: (1) enabling appropriately credentialed government officials to alert the public to imminent threats that present a significant risk of injury or death; and (2) incorporating multiple communications technologies without interfering with existing alerts or communications systems employed by emergency response personnel. The WARN Act also directed the initiation of proceedings to: (1) allow licensees providing commercial mobile service to elect to transmit system alerts to mobile subscribers; and (2) require public broadcast television licensees to install necessary equipment to enable transmitters to receive and retransmit system alerts.

The WARN Act has led to the development of Wireless Emergency Alerts (WEA), formerly known as the Commercial Mobile Alert System (CMAS) and also known as Personal Localized Alerting Network (PLAN), which is an alerting network in the United States designed to disseminate emergency alerts to network user equipment such as mobile devices, cell phones, and pagers operating on variety of network technologies. Some European countries have also implemented similar requirements for mobile operators operating in their nations, resulting in the deployment of alerting systems equivalent to those deployed in the United States.

As emergency message broadcast/alert has matured as a service, the desire to utilize such service has also expanded to the delivery of commercial advertisement. Cell Broadcasting Center (CBC) network equipment, such as the Alcatel-Lucent Broadcasting Message Center (BMC), which fulfills emergency and alerting needs and desires (i.e., functionality) has been deployed in many markets and by many service providers (AT&T, VZ, Sprint, etc.).

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Current practice and standards (e.g., Cell Broadcast Service Protocol (CBSP), Service Area Broadcast Protocol (SABP) and the like) support the delivery of alert messages to user equipment which may be accessible to multiple technology networks. However, current practice and standards do not prevent from duplicated alert messages to user equipment which is accessible to multiple technology networks.

Accordingly, a multi-network user equipment (e.g., hybrid handset capable of communication on multiple technology networks) may receive the alerts from multiple technology networks, for example from both a Code Division Multiple Access (CDMA) network and from a Long Term Evolution (LTE) network. Conventional CBCs assign independent LTE serial numbers and CDMA message identifiers for each of these different network types. As a result, a multi-network user equipment receiving a same alert message from a CDMA network and an LTE network will receive two different numbers/identifiers and interpret the received alert messages as two separate/different alert messages. Thus, a user of a multi-network device may be repeatedly and unnecessarily alerted to an emergency situation. When the alert message includes advertising content, the user of a multi-network device may be repeatedly provided with the same advertising content, which may thus have the effect opposite to that of interesting the user in the advertised goods and services and engendering goodwill for the advertiser.

Conventional user equipment does not compare the text of the alert message of distinct alert messages in order to identify whether the alert message is a duplicate of an already received alert message. Further, neither the Alliance for Telecommunications Industry Solutions (ATI), the Telecommunications Industry Association (TIA) nor other standards development organizations appear to have addressed the cross technology alert message duplication issue described above.

As discussed herein, a problem with the current methodologies of providing alert messages to multi-network user equipment is that they lessen the impact of and potential destroy the value of such alert messages due to repeated reception and presentation of a same alert message to the user of the multi-network user equipment.

The disclosed subject matter is directed to addressing the effects of one or more of the problems set forth above.

In one embodiment, a method comprises receiving at a cell broadcast center information for distribution to at least one user equipment; determining at the cell broadcast center an alert category and a message number for the alert category, the alert category based on the information for distribution, the message number for the alert category based on a number of alert messages previously forwarded for the alert category, the alert category associated with one or more corresponding alert categories of a plurality of technology networks with which the cell broadcast center is configured to interact; and forwarding an alert message from the cell broadcast center to the at least one user equipment via one or more of the plurality of technology networks, the alert message including the message number for the alert category and an alert category indicator indicating a respective corresponding alert category of the one or more corresponding alert categories that corresponds with the alert category.

In one embodiment, the method also includes generating the alert message including the alert category indicator and the message number for the alert category.

In one embodiment, the information for distribution relates to an emergency notification, a network test, or a commercial advertisement.

In one embodiment, the method also includes incrementing the number of alert messages previously forwarded for the alert category after the determining of the alert category and the message number for the alert category.

In one embodiment, the alert category is one of a plurality of alert categories and the method also includes maintaining for each respective one of the plurality of alert categories a corresponding number of alert messages previously forwarded for the respective one of the plurality of alert categories.

In one embodiment, the method also includes receiving second information for distribution to the at least one user equipment; determining the second information for distribution is associated with the alert category; determining a next message number for the alert category; and forwarding a second alert message to the at least one user equipment via at least one of the plurality of technology networks, the second alert message including the next message number for the alert category and a second alert category indicator indicating one of the one or more corresponding alert categories that corresponds with the alert category. The next message number for the alert category may be a next sequential number.

In one embodiment, determining the alert message including the alert category indicator and the message number for the alert category comprises mapping the information for distribution to the alert category, the alert category being one of a plurality of alert categories, the alert category being one of presidential, extreme, severe, amber, test and commercial.

In one embodiment, the alert category is one of presidential, extreme, severe, amber, test and commercial.

In one embodiment, the plurality of technology networks with which the cell broadcast center is configured to interact include at least a CMDA network and an LTE network, the alert category of the alert message is extreme, and the one or more corresponding alert categories of a plurality of technology networks interacted with by the cell broadcast center include extreme, extreme/immediate/observed, extreme/immediate/likely, extreme/expected/observed, extreme/expected/likely.

In one embodiment, an apparatus includes a processor and a memory communicatively connected to the processor. The processor configured to receive information for distribution to at least one user equipment; determining an alert category and a message number for the alert category, the alert category based on the information for distribution, the message number for the alert category based on a number of alert messages previously forwarded for the alert category, the alert category associated with one or more corresponding alert categories of a plurality of technology networks via which the apparatus communicates; and forward an alert message to the at least one user equipment via one or more of the plurality of technology networks, the alert message including the message number for the alert category and an alert category indicator indicating a respective corresponding alert category of the one or more corresponding alert categories that corresponds with the alert category.

The processor may be configured to generate the alert message including the alert category indicator and the message number for the alert category. The information for distribution may relate to an emergency notification, a network test, or a commercial advertisement.

In another embodiment, the processor is configured to increment the number of alert messages previously forwarded for the alert category after having determined the alert category and the message number for the alert category.

In another embodiment, the alert category is one of a plurality of alert categories, and the processor is configured to maintain in the memory for each respective one of the plurality of alert categories a corresponding number of alert messages previously forwarded for the respective one of the plurality of alert categories.

In another embodiment, the processor is configured to determine that second information for distribution is associated with the alert category of a most recently forwarded alert message of the alert category; determine a next message number for the alert category; and forward a second alert message to the at least one user equipment via at least one of the plurality of technology networks, the second alert message including the next message number for the alert category and a second alert category indicator indicating one of the one or more corresponding alert categories that corresponds with the alert category. The next message number for the alert category may be a next sequential number.

In another embodiment, the processor is configured to map the information for distribution to the alert category, the alert category being one of a plurality of alert categories, the alert category being one of presidential, extreme, severe, amber, test and commercial.

In another embodiment, the alert category is one of presidential, extreme, severe, amber, test and commercial.

In another embodiment, the processor is configured to communicate via at least a CMDA network and an LTE network, the alert category of the alert message is extreme, and the one or more corresponding alert categories include extreme, extreme/immediate/observed, extreme/immediate/likely, extreme/expected/observed, extreme/expected/likely.

Another apparatus embodiment may include a processor and a memory communicatively connected to the processor, wherein the processor may be configured to perform any of the methods described above.

In yet another embodiment, a computer program product comprises a computer usable medium excluding signals and has computer readable instructions embodied therein, said computer readable instructions adapted to be executed to implement a method, said method comprising any of the above described methods.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase (i.e., a definition that is different from the ordinary and custom-ary meaning as understood by those skilled in the art) is intended to be implied by consistent usage of the term or phrase herein. To the extent that a term or phrase is intended to have a special meaning (i.e., a meaning other than that understood by skilled artisans) such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, provided are methodology and apparatuses for providing a unique alter message number per alter category for applicable technology networks. One or more embodiments provide new broadcasting message service feature with enhancements of unique alert message number per alert category for applicable technology networks. According to the provided embodiments, user equipment with multiple network access will not display the duplicated alert messages and will do so even without comparing the text of alert messages.

Figure 1:
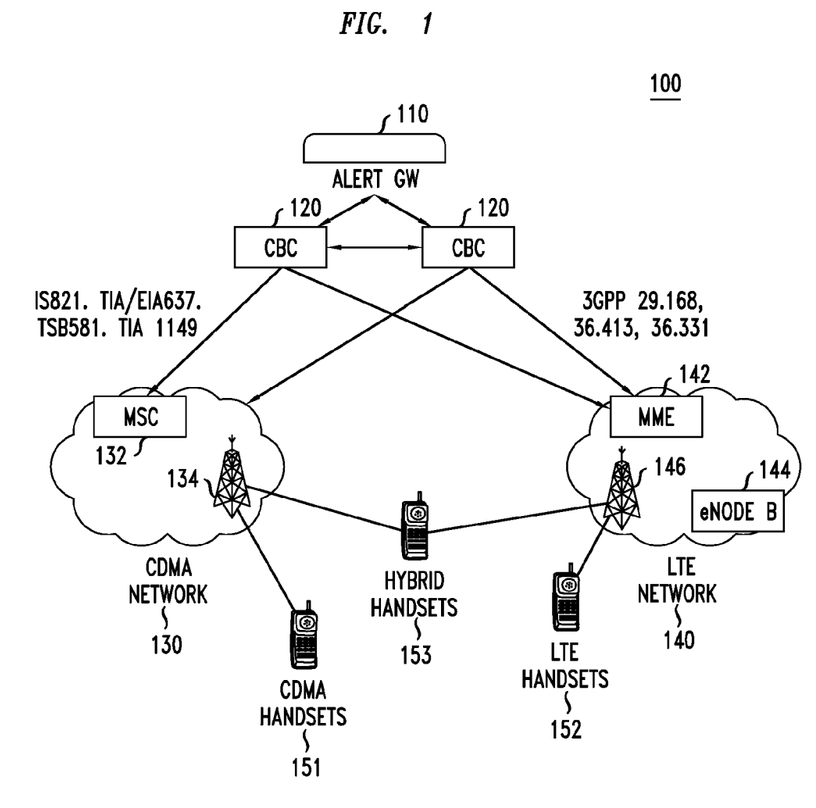
FIG. 1 conceptually illustrates one example embodiment of a wireless communication system according to the principles of the invention.

FIG. 1 conceptually illustrates one example embodiment of a wireless communication system according to the principles of the invention. The wireless communication system 100 includes Alert Gateway (GW) 110, Cell Broadcast Centers (CBC) 120, CDMA network 130 and LTE network 140 and User Equipment (UE) 151, 152, 153.

Alert Gateway (GW) 110 is network node equipped for interfacing information associated with an alert message for distribution to one or more UE's to CBC 120. In general, a GW is network node equipped for interfacing with another network that uses different communication protocols. Information associated with an alert message may be input to an computer or computer network (not shown) to which the alert gateway interfaces.

Cell Broadcast Centers (CBC) 120 forward alerts messages for delivery by a one or more of a plurality of technology networks. As illustrated in FIG. 1, CBC 120 communicates with CDMA network 130 and LTE network 140. CBC 120 communicates with CDMA network 130 using one or more of IS821, TIA/EIA637, TSB581, TIA1149 and the like. CBC 120 communicates with LTE network 140 using one or more of 3GPP 29.168, 36.413, 36,331 and the like.

CDMA network 130 includes Mobile Switching Center 132 which is responsible for routing voice calls and Short Message Service (SMS) as well as other services (such as conference calls, FAX and circuit switched data). The MSC sets up and releases the end-to-end connection via antenna 134, handles mobility and hand-over requirements during the call and takes care of charging and real time pre-paid account monitoring. Other elements (not shown) of CDMA network 130 are well know to those skilled in the art and thus not unnecessarily described here.

LTE network 140 includes Mobility Management Element (MME). Responsibilities of the MME include idle mode UE tracking and paging including retransmissions, involvement in bearer activation/deactivation process, and choosing the Serving Gateway (SGW) (not shown) for a UE at the initial attach and at time of intra-LTE handover. Other elements (not shown) of the LTE network 140 are well know to those skilled in the art and thus not unnecessarily described here. MME 142 is interconnected with eNodeB 144 which is able to communicate via antenna 416 with LTE capable UEs 152-153. The eNodeB 144 provides the hardware and functionality for communicating directly between the UE and the 3GPP network.

UE 151-153 may implement transceivers that include transmitters for transmitting uplink signals towards the CDMA network 130 and LTE network 140 (via reverse link) and receivers for receiving downlink signals transmitted by the CDMA and LTE networks (via forward link). Communication over the air interface between a UE and the respective networks takes places according to various agreed-upon standards and/or protocols. For example, UE 151-153 may be a mobile handset, a cellular phone, a smart phone, a tablet computer, a laptop computer, or the like.

UE 151 is a CDMA handset able to communicate via CDMA network 130.

UE 152 is a LTE handset able to communicate via LTE network 140.

UE 153 is a CDMA handset able to communicate via CDMA network 130 an LTE network 140.

Persons of ordinary skill in the art having benefit of the present disclosure should appreciate that the standards or protocols and network technologies are intended to be exemplary and other embodiments may use other standards or protocols and network technologies for supporting communication within the wireless communication system 100. For example, a multi-technology handset may able to communicate via two or more of a CDMA network, LTE network, Wideband-CDMA network, and Global System for Mobile Communications (GSM) network among other varied technology networks.

CBC 120 need to provide enough numbers to be assigned to the alerts for given profile. One possible way to do so is the assignment of new unique system level number to every new alert. With such assignment, every new alert will consume one system level number, regardless of whether a respective new alert is sent to CDMA network only, or to LTE network only, or to both CDMA and LTE networks. For a Wireless Emergency Alerts (WEA) profile (e.g., four (4) alerts per minute) and alert expiration at twenty four (24) hours (e.g., its maximum value), the number of unique system level numbers to be used by alert messages is twenty-four (24) hours per day*sixty (60) minutes per hour*four (4) alert messages per minute=five thousand seventy hundred sixty (5760) alerts messages per day.

If a traffic profile with additional alerts per minute is desired, one readily understands that a unique system level number would be required to handled and satisfy an even larger number of alert messages per day. However, the alert message serial number conventionally used for LTE allows only five hundred-twelve (512) unique numbers (i.e., nine (9) bits of Message Code field). This message numbering system is not sufficient to cover either of the traffic profiles mentioned above.

Since WEA does not use the update bits (i.e., 4 bits) of the serial number defined by 3GPP23.041, it may be possible to enhance the range of unique system level numbers for alert messaging. With additional use of the update bits, thirteen (13) bits (i.e., 9+4) can be used to uniquely identify an alert. With such concept, eight thousand one hundred ninety two ($8192=2^{13}$) system level numbers would be available to uniquely identify an alert. However, this amount of system level numbers is also not sufficient to handle some desired traffic profiles. Therefore, a CBC according to one embodiment of the invention is adapted to support as many alert message serial numbers as may be reasonably expected to be necessary to support any traffic profile defined by any customer; this may be accomplished by utilizing the same unique alert message number across different technology network alert broadcasting. UEs with multiple network access will not display duplicated alert messages even without comparing the text of the alert message; these UEs are able to filter repeated alert messages received via multiple technology networks and having the same substantive alert message. For example, these UEs are able to filter repeated alert messages having the same unique alert message number for a particular category to which the corresponding alert category of a received alert message is mapped. The alert message number within each given alert category will be unique, while the same alert message number can be used in the different given categories since UEs are able to determine the message number per category. In this manner, embodiments of the provided solution will enable sufficient unique numbers for traffic profiles used by service providers.

The CBC uses logic based on message categories for alert message number assignments. In one embodiment, LTE message identifiers (MIs) format will be used for a plurality technology networks. The LTE MIs are logically grouped and associated with all message categories for all technology networks. In this manner, the assigned alert message numbers will not be depleted as quickly as in the prior art as they are generated per message category. In another embodiment, the categories of a different network technology may be used as the format for a plurality of other network technologies.

To best fit existing emergency alerting practice and standards without impacting network architecture and UE design, the following conditions are considered:

There are no opaque extension attributes that the CBC can use to pass additional data to UE (e.g., CDMA and LTE phones).

The solution should be interoperable with current standards such that it does not break existing phones (implies that should not narrow scope of CDMA IDs) and does not break eNB duplicate message detection Accordingly, in one embodiment, the same unique alert message number will be used across different technology network alert broadcasting with the LTE serial number chosen as global format of alerting message number for all technology networks. For example, the CBC will use the LTE serial number (Message Identifier) to CDMA network but meet WEA criteria.

Figure 2:
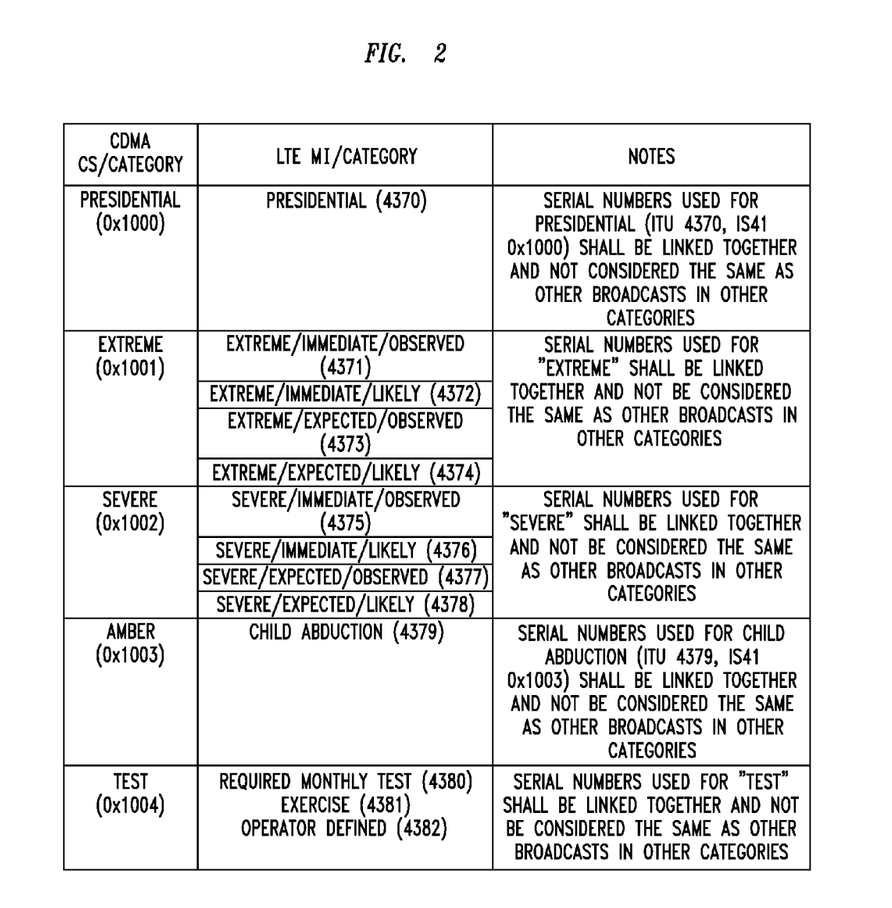
FIG. 2 is a table indicating criteria by which corresponding alert categories of a plurality of network technologies may be classified to an alert category for five example alert categories.

In one embodiment, the assignment of the message number to emergency alerts sent to the network will be done per the following categories: Presidential, Extreme, Severe, Amber, and Test. Alerts may be classified to one of five above categories based on criteria reflected in FIG. 2. FIG. 2 is a table indicating criteria by which corresponding alert categories of a plurality of network technologies may be classified to an alert category for the five above listed alert categories. The first column in FIG. 2 indicates CDMA categories which are one or more corresponding categories of a first network technology with respect to the categories named above in this paragraph; the CDMA categories correspond exactly to the categories name above in this paragraph. The second column in FIG. 2 indicates one or more LTE Message Identifers (MI) (i.e. categories) which are one or more corresponding categories of second network technology by which the CBC is able to communicate; one or more of the LTE categories correspond to each of the categories named above in this paragraph. The third column in FIG. 2 details the linkage between the categories named above in this paragraph, the one or more corresponding categories of the CDMA network technology, and the one or more corresponding categories of the LTE network technology. For example, the CDMA presidential category and the LTE presidential category shall be linked together and not considered the same as broadcasts in other categories; these corresponding categories both are considered part of a generic presidential category having its own independent message number. For example, the CDMA extreme category and the LTE extreme, extreme/immediate/observed, extreme/immediate/likely, extreme/expected/observed, extreme/expected/likely categories shall be linked together and not considered the same as broadcasts in other categories; this group of corresponding categories are considered part of a generic extreme category having its own independent message number. The CBC will apply one bucket of message numbers for each generic category.

An unused serial number is assigned within each of the five categories first listed in the prior paragraph. The CBC will apply one bucket of numbers for all commercial alerts. Commercial alerts are indicated by LTE Message Identifiers and CDMA Service Codes (alert categories of respective ones of a plurality of technology) that are different than those for emergency alerts; therefore, the set of message numbers used for emergency alerts may also be used for commercial alerts. Service codes are the categories for CDMA and MI are categories for LTE. As further described herein, categories for a particular technology network correspond to (i.e., are linked to) a generic category for which there is an independent message number counter. Linked categories for a particular technology network are not considered the same as other alert messages broadcast in other categories.

Essentially, all alert broadcasts are assigned to a numbering category and all new alert broadcasts must be assigned a unique number relative to the active alerts in its numbering category. For WEA, the numbering category is equivalent to the CDMA category. Given the concept that unique numbers are assigned per category and not system wide, the number of unique alerts seen from the handset perspective is significantly higher. For the traffic evenly distributed across all categories the max unique numbers is 5 times higher than in calculation described above, i.e. eight thousand one hundred ninety two (8192)*five (5)=forty thousand nine hundred sixty (40,960) and this amount of number is reasonably expected to be fully sufficient to support cover any traffic profile currently anticipated. With a commercial advertisement category, additional number of alerts may be handled.

Figure 3:
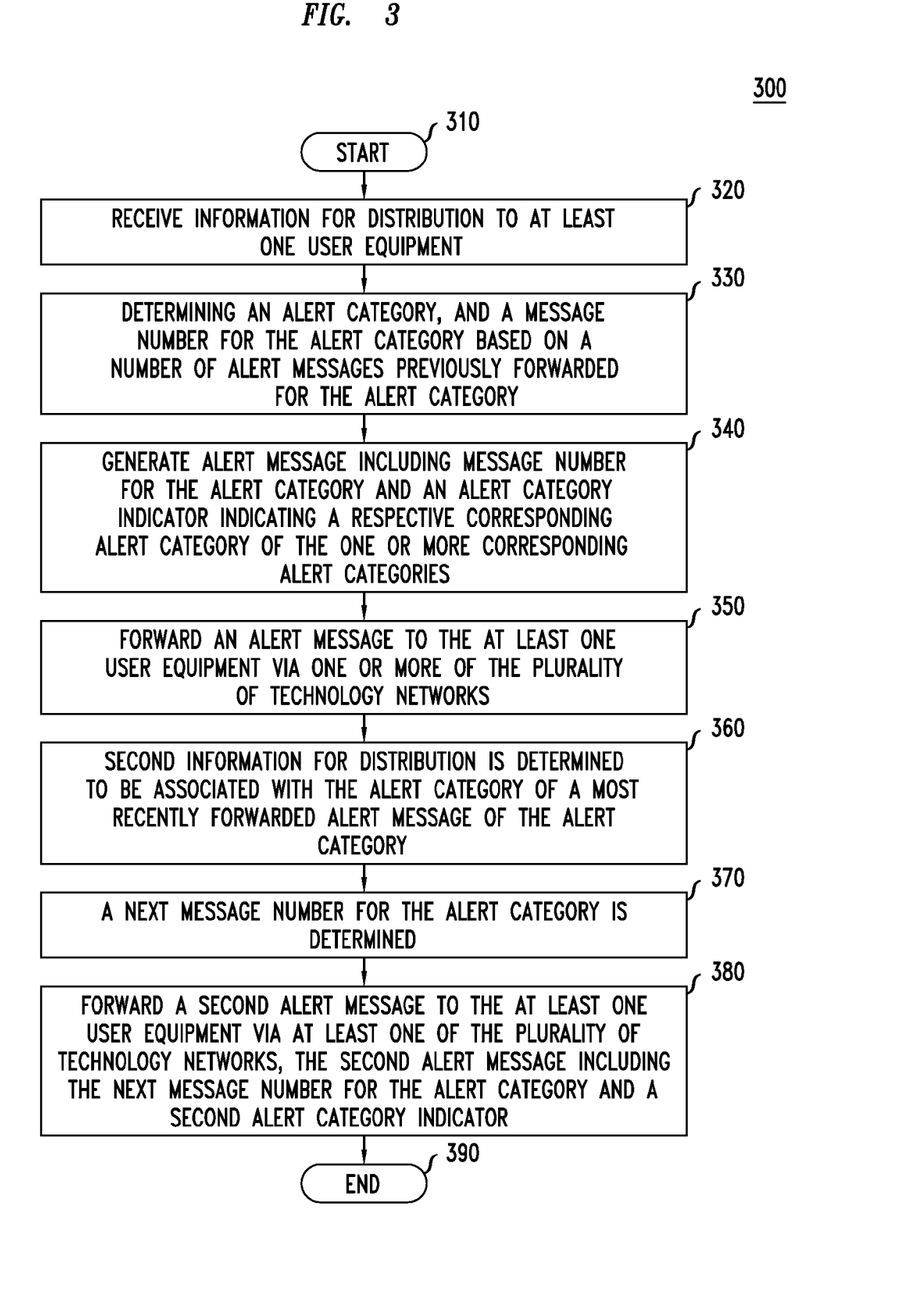
FIG. 3 conceptually illustrates one exemplary embodiment of a method that may be implemented in an apparatus, such as the alert gateway shown in FIG. 1, according to the principles of the invention.

FIG. 3 conceptually illustrates one exemplary embodiment of a method that may be implemented in an apparatus, such as the CBC shown in FIG. 1, according to the principles of the invention.

At 310, the method starts.

In operation 320, information for distribution to at least one user equipment is received. The information for distribution may relate to an emergency notification, a network test, or a commercial advertisement.

In operation 330, an alert category and a message number for the alert category are determined. The alert category is determined based on the information for distribution. The alert category is associated with one or more corresponding alert categories of a plurality of technology networks via which the apparatus communicates. The message number for the alert category is determined based on a number of alert messages previously forwarded for the alert category. Operation 330 may include mapping the information for distribution to the alert category with the alert category being one of a plurality of alert categories. The alert category may be one of presidential, extreme, severe, amber, test and commercial In operation 340, the alert message including an alert category indicator and the message number for the alert category is generated. The alert category indicator indicates a respective corresponding alert category of the one or more corresponding alert categories that corresponds with the alert category.

In operation 350, the alert message is forwarded to the at least one user equipment via one or more of the plurality of technology networks. The alert message includes the message number for the alert category and an alert category indicator indicating a respective corresponding alert category of the one or more corresponding alert categories that corresponds with the alert category.

The number of alert messages previously forwarded for the alert category is increment after having determined the alert category and the message number for the alert category as part of operation 340 or operation 350. The alert category may be one of a plurality of alert categories, and a corresponding number of alert messages previously forwarded for a respective one of the plurality of alert categories maintained in the memory for each respective one of the plurality of alert categories.

In optional operation 360, second information for distribution is determined to be associated with the alert category of a most recently forwarded alert message of the alert category.

In optional operation 370; a next message number for the alert category is determined In optional operation 380, forward a second alert message to the at least one user equipment via at least one of the plurality of technology networks, the second alert message including the next message number for the alert category and a second alert category indicator indicating one of the one or more corresponding alert categories that corresponds with the alert category. The next message number for the alert category may be a next sequential number.

At 390, the method ends.

Proposed is a new broadcasting message service feature with unique alert message number per alert category for applicable technology networks. With the new proposed embodiments, UE with multiple network access will not display the duplicated alert messages even without comparing the text. One, same number of an alerting message is sent to multiple technology networks. A multi-technology handset will see the same number from different networks, and so be able to prevent displaying the same alert twice, such as for example when a user changes the handset from one network to another network. Multi-technology UEs according to one embodiment of the invention are able to filter out display of repeated alert messages having the same unique alert message number for a particular category to which the corresponding alert category of a received alert message is mapped.

For example, assume first an LTE presidential alert message having a particular alert message number is received by a multi-technology UE. The multi-technology UE is able to determine that the LTE presidential alert message maps to the presidential category. The particular alert message number of the LTE presidential alert message is registered as the first presidential category message received. Assume a CDMA presidential alert message having the particular alert message number is then received by the multi-technology UE. The multi-technology UE is able to determine that the CDMA presidential alert message maps to the presidential category, and that the particular alert message number received in the CDMA presidential alert message is the same as the particular alert message number received in a previously received alert message of the presidential category. Accordingly, the multi-technology UE will prevent the display of the received CMDA presidential alert message so as to avoid repeatedly presenting the same presidential alter message to a user of the UE.

Benefits of the provided embodiments include one or more of the following:

the alert message number for each alert category can be uniquely maintained;

a same alert message number can be used in each the different alert categories;

a same alert message number can be used across multiple technology network alert broadcasting for a given alert;

LTE message identifiers (MIs) format can be used for multiple technology networks;

existing emergency alerting network standards, architecture, and protocols are not altered; and handset designs and performances are not impacted.

Figure 4:
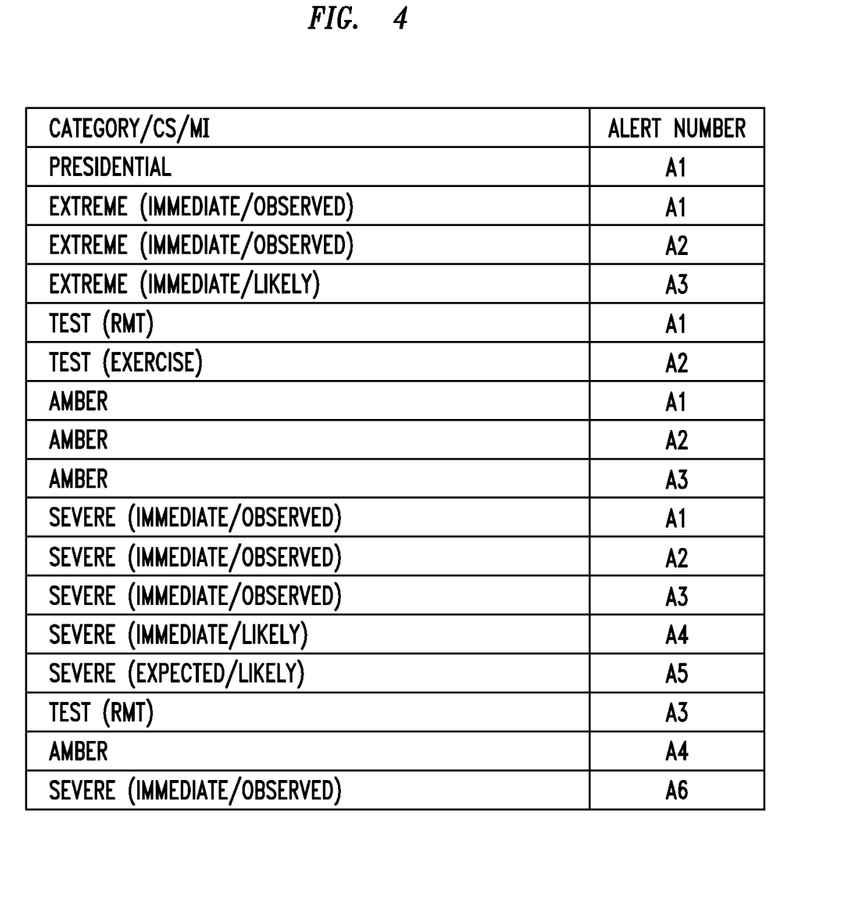
FIG. 4 is a table presenting an example of alerts to be sent to CDMA+LTE networks (in the order of alert occurrence) and the message numbers assigned per alert category by a CBC according to the principles of the invention.
Figure 5:
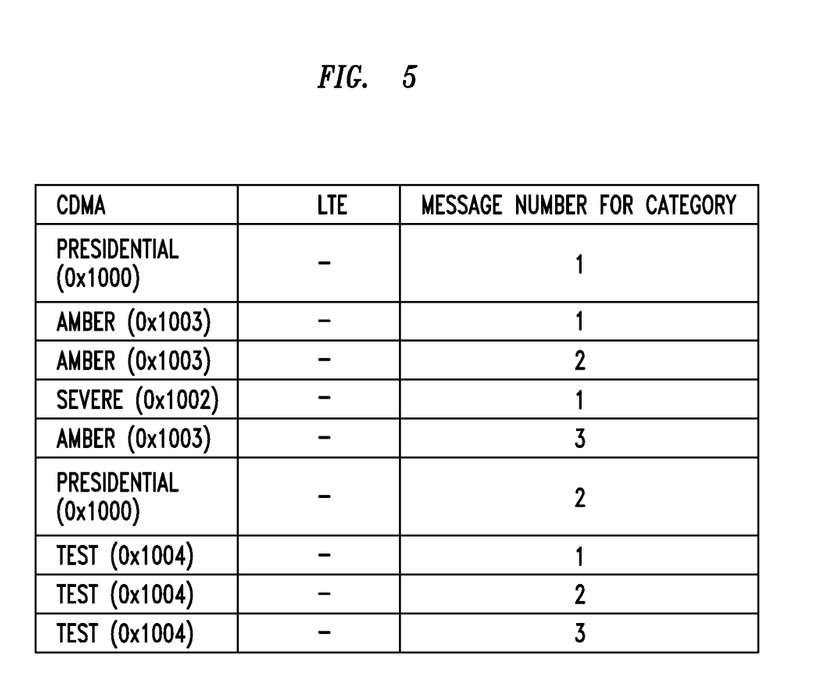
FIG. 5 is a table presenting an example of CDMA-only alerts to be sent to CDMA networks (in the order of alert occurrence) and the message numbers assigned per alert category by a CBC according to the principles of the invention.

FIG. 4 is a table presenting an example of alerts to be sent to CDMA+LTE networks (in the order of alert occurrence) and the message numbers assigned per alert category by a CBC according to the principles of the invention. For example, a first extreme category message, be it a message FIG. 5 is a table presenting an example of CDMA-only alerts to be sent to CDMA networks (in the order of alert occurrence) and the message numbers assigned per alert category by a CBC according to the principles of the invention.

Figure 6:
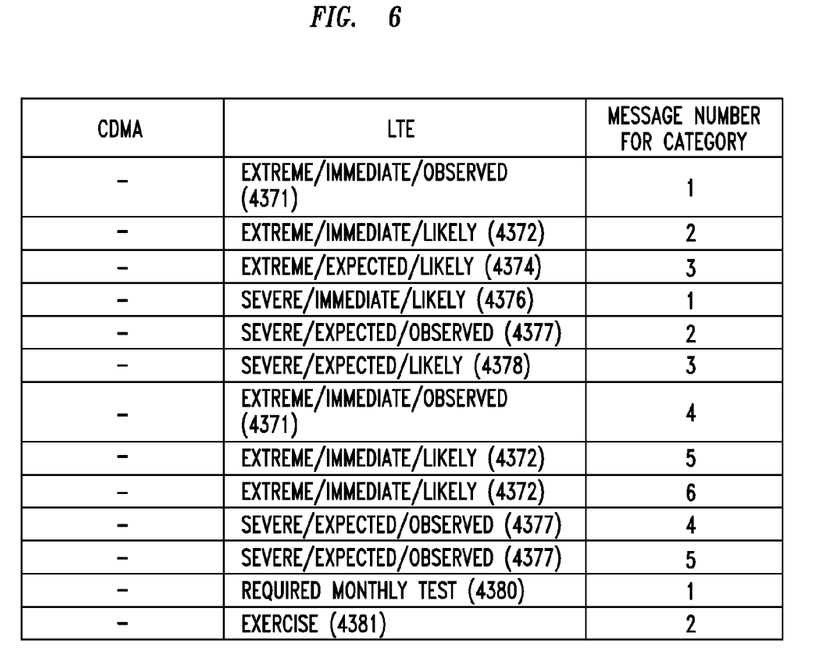
FIG. 6 is a table presenting an example of LTE-only alerts to be sent to LTE networks (in the order of alert occurrence) and the message numbers assigned per alert category by a CBC according to the principles of the invention.

FIG. 6 is a table presenting an example of LTE-only alerts to be sent to LTE networks (in the order of alert occurrence) and the message numbers assigned per alert category by a CBC according to the principles of the invention.

Figure 7:
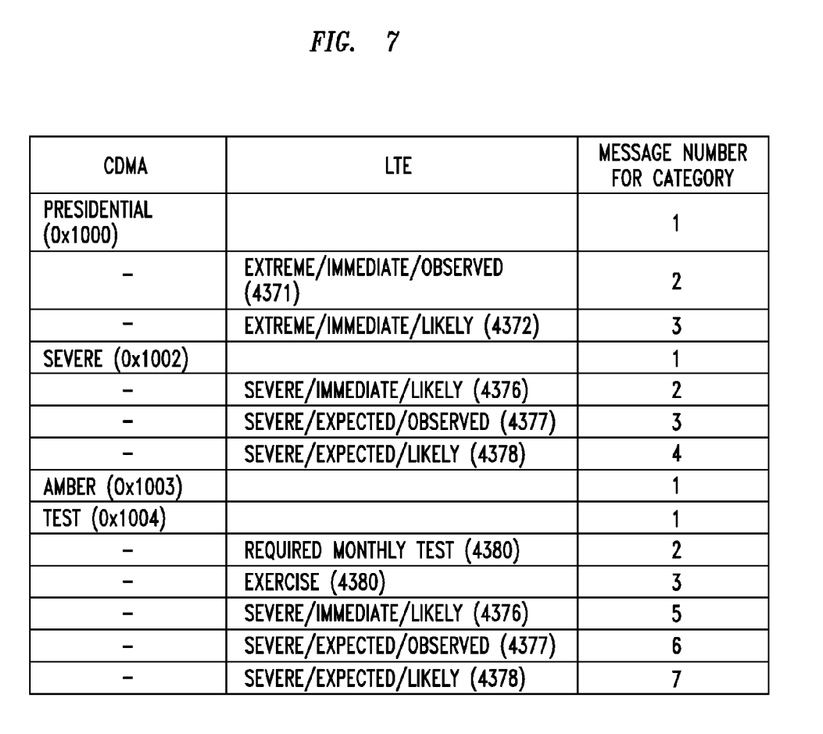
FIG. 7 is a table presenting an example of CDMA-only alerts and LTE only alerts to be sent to CDMA networks and LTE networks respectively (in the order of alert occurrence) and the message numbers assigned per alert category by a CBC according to the principles of the invention.

FIG. 7 is a table presenting an example of CDMA-only alerts and LTE only alerts to be sent to CDMA networks and LTE networks respectively (in the order of alert occurrence) and the message numbers assigned per alert category by a CBC according to the principles of the invention.

Figure 8:
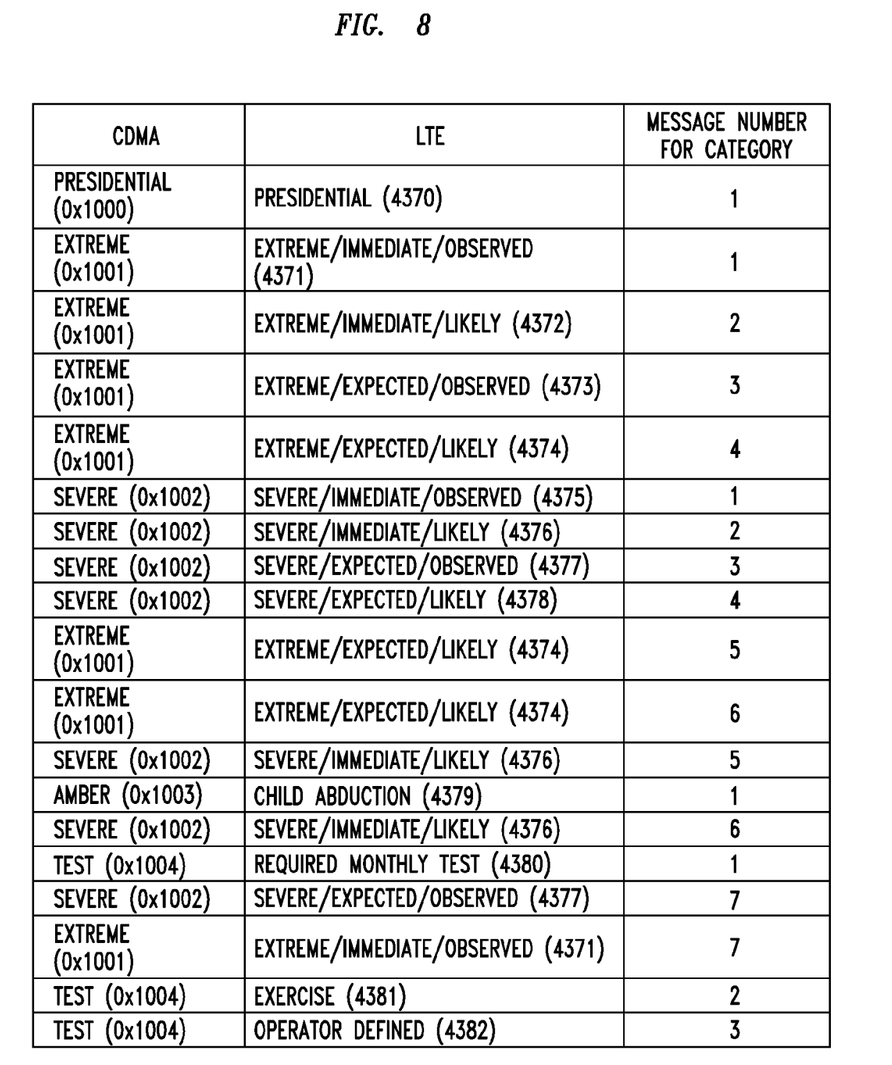
FIG. 8 is a table presenting an example of CDMA and LTE alerts to be sent to CDMA networks and/or LTE networks (in the order of alert occurrence) and the message numbers assigned per alert category by a CBC according to the principles of the invention.

FIG. 8 is a table presenting an example of CDMA and LTE alerts to be sent to CDMA networks and/or LTE networks (in the order of alert occurrence) and the message numbers assigned per alert category by a CBC according to the principles of the invention.

Figure 9:
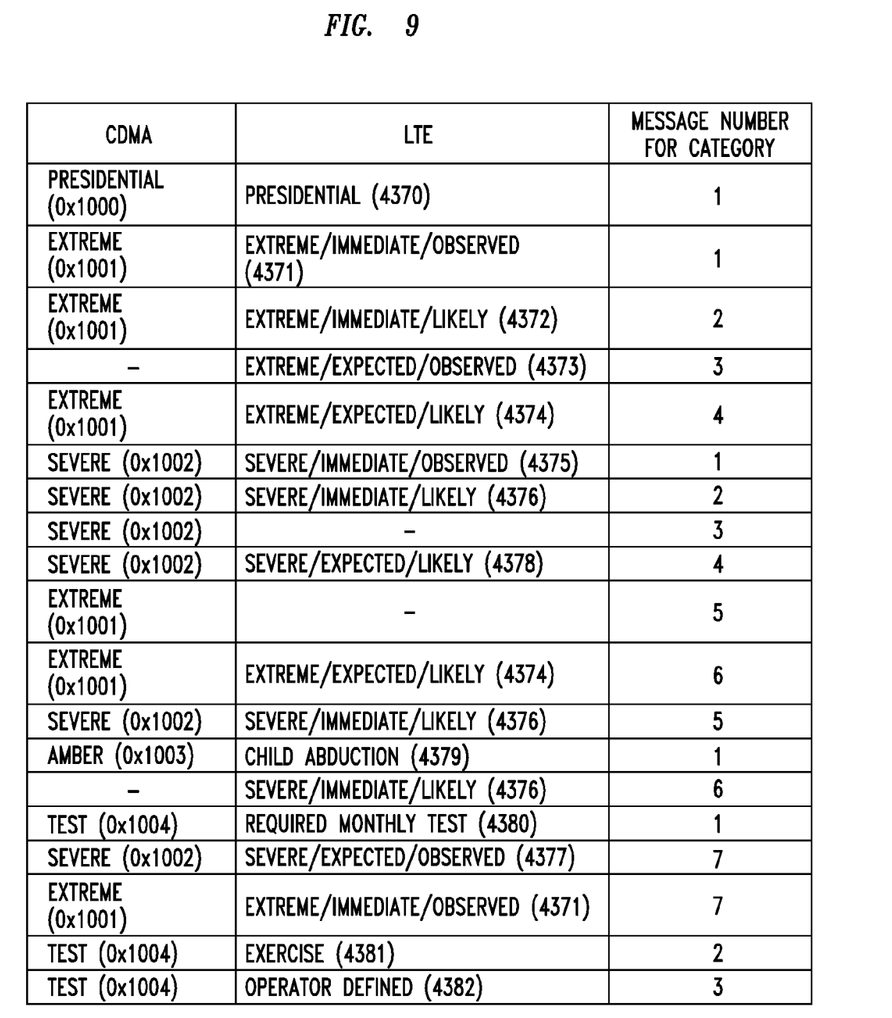
FIG. 9 is a table presenting an example of CDMA and/or LTE alerts to be sent to CDMA networks and/or LTE networks (in the order of alert occurrence) and the message numbers assigned per alert category by a CBC according to the principles of the invention.

FIG. 9 is a table presenting an example of CDMA and/or LTE alerts to be sent to CDMA networks and/or LTE networks (in the order of alert occurrence) and the message numbers assigned per alert category by a CBC according to the principles of the invention.

Figure 10:
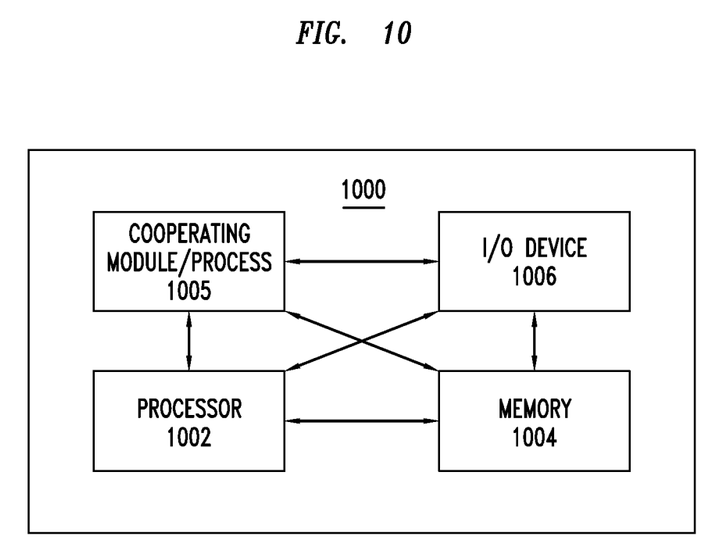
FIG. 10 depicts a high-level block diagram of a computer suitable for use in performing functions described herein.

FIG. 10 depicts a high-level block diagram of a computer suitable for use in performing functions described herein. The computer 1000 includes a processor 1002 (e.g., a central processing unit (CPU) or other suitable processor(s)) and a memory 1004 (e.g., random access memory (RAM), read only memory (ROM), and the like).

The computer 1000 also may include a cooperating module/process 1005. The cooperating process 1005 can be loaded into memory 1004 and executed by the processor 1002 to implement functions as discussed herein and, thus, cooperating process 1005 (including associated data structures) can be stored on a computer readable storage medium, e.g., RAM memory, magnetic or optical drive or diskette, and the like.

The computer 1000 also may include one or more input/output devices 1006 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 1000 depicted in FIG. 10 provides a general architecture and functionality suitable for implementing functional elements described herein or portions of functional elements described herein. For example, the computer 1000 provides a general architecture and functionality suitable for implementing one or more of Alert Gateway (GW) 110, Cell Broadcast Centers (CBC) 120, one or more elements of CDMA network 130, one or more elements LTE network 140, User Equipment (UE) 151, 152, 153, or the like.

Benefits of the provided embodiments include one or more of the following:

the alert message number for each alert category can be uniquely maintained;

a same alert message number can be used in each the different alert categories;

a same alert message number can be used across multiple technology network alert broadcasting for a given alert;

LTE message identifiers (MIs) format can be used for multiple technology networks;

existing emergency alerting network standards, architecture, and protocols are not altered; and handset designs and performances are not impacted.

It will be appreciated that the functions depicted and described herein may be implemented in hardware or a combination of software and hardware, e.g., using a general purpose computer, via execution of software on a general purpose computer so as to provide a special purpose computer, using one or more application specific integrated circuits (ASICs) or any other hardware equivalents, or the like, as well as various combinations thereof.

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of storage medium or implemented over some type of transmission medium. The storage medium, such as a non-transitory storage medium, may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method at a cell broadcast center comprising:
   receiving information related to an alert message for distribution to at least one user equipment;
   determining an alert category from among a plurality of categories associated with one or more technology networks for the alert message;
   assigning a unique message number for the determined alert category, from a plurality of message numbers based on a number of alert messages previously forwarded for the determined alert category;
   forwarding the alert message comprising the assigned message number and an alert category indicator associated with the determined category from the cell broadcast center to at least one user equipment via the one or more technology networks, and
   using the same plurality of message numbers to assign a message number to each alert message within a next message category among the plurality of alert message categories,
   further comprising
   mapping the received information to the plurality of alert categories, the alert categories comprising at least one of presidential, extreme, severe, amber, test and commercial.

2. The method of claim 1 further comprising:
   generating the alert message including the alert category indicator and the message number for the alert category.

3. The method of claim 1 wherein the alert message relates to an emergency notification, a network test, or a commercial advertisement.

4. The method of claim 1 further comprising:
   incrementing the number of alert messages previously forwarded for the determined alert category after forwarding the alert message.

5. The method of claim 1 further comprising:
   maintaining a number of alert messages previously forwarded for each of the plurality of alert categories.

6. The method of claim 1 further comprising:
   receiving next information related to a next alert message;
   determining a next alert category from among the plurality of categories associated with the one or more technology networks for the next alert message;
   assigning a unique message number for the determined, next alert category from the same plurality of message numbers based on a number of alert messages previously forwarded for the next determined alert category;
   forwarding the next alert message comprising its assigned message number and a next alert category indicator associated with the next determined category to at least one user equipment via the one or more technology networks.

7. The method of claim 1 wherein the message number is a sequential number.

8. The method of claim 1 wherein the determined alert category comprises one of presidential, extreme, severe, amber, test and commercial.

9. The method of claim 1, wherein the plurality of technology networks comprise at least a CMDA network and an LTE network, and wherein the determined alert category comprises one of extreme, extreme/immediate/observed, extreme/immediate/likely, extreme/expected/observed, extreme/expected/likely.

10. The apparatus of claim 9 wherein the message number is a sequential number.

11. The apparatus of claim 9 wherein the processor is configured to execute stored instructions to map the received information to the plurality of alert categories, the alert categories comprising presidential, extreme, severe, amber, test and commercial.

12. An apparatus comprising:
    a processor and a memory communicatively connected to the processor, the processor configured to execute stored instructions to:
    receive information related to an alert message;
    determine an alert category from among a plurality of categories associated with one or more technology networks for the alert message;
    assign a unique message number for the determined, alert category from a plurality of message numbers based on a number of alert messages previously forwarded for the determined alert category;
    forward the alert message comprising its assigned message number and an alert category indicator associated with the determined category to at least one user equipment via the one or more technology networks; and
    use the same plurality of message numbers to assign a message number to each alert message within a next message category among the plurality of alert message categories,
    further comprising
    mapping the received information to the plurality of alert categories, the alert categories comprising at least one of presidential, extreme, severe, amber, test and commercial.

13. The apparatus of claim 12 wherein the processor is configured to execute stored instructions to generate the alert message including the alert category indicator and the message number for the alert category.

14. The apparatus of claim 12 wherein the alert message relates to an emergency notification, a network test, or a commercial advertisement.

15. The apparatus of claim 12 wherein the processor is configured to execute stored instructions to increment the number of alert messages previously forwarded for the determined alert category after forwarding the alert message.

16. The apparatus of claim 12 wherein the processor is configured to execute stored instructions to maintain in the memory a corresponding number of alert messages previously forwarded for each of the plurality of alert categories.

17. The apparatus of claim 12 wherein the processor is configured to execute stored instructions to:
receive next information related to a next alert message;
determine a next alert category from among the plurality of categories associated with the one or more technology networks for the next alert message;
assign a unique message number for the determined, next alert category from the same plurality of message numbers based on a number of alert messages previously forwarded for the next determined alert category;
forward the next alert message comprising its assigned message number and a next alert category indicator associated with the next determined category to at least one user equipment via the one or more technology networks.

18. The apparatus of claim 12 wherein the determined alert category comprises one of presidential, extreme, severe, amber, test and commercial.

19. The apparatus of claim 12 wherein the processor is configured to execute stored instructions to communicate via the plurality of technology networks comprising at least a CMDA network and an LTE network, and wherein the determined alert category comprises extreme, extreme/immediate/observed, extreme/immediate/likely, extreme/expected/observed, extreme/expected/likely.

20. An electronic memory comprising stored executable instructions for implementing a method at a cell broadcast center, said method comprising:
receiving information related to an alert message;
determining an alert category from among a plurality of categories associated with one or more technology networks for the alert message;
assigning a unique message number for the determined, alert category from a plurality of message numbers based on a number of alert messages previously forwarded for the determined alert category;
forwarding the alert message comprising its assigned message number and an alert category indicator associated with the determined category to at least one user equipment via the one or more technology networks; and
using the same plurality of message numbers to assign a message number to each alert message within a next message category among the plurality of alert message categories,
further comprising
mapping the received information to the plurality of alert categories, the alert categories comprising at least one of presidential, extreme, severe, amber, test and commercial.

* * * * *